Figure 1:
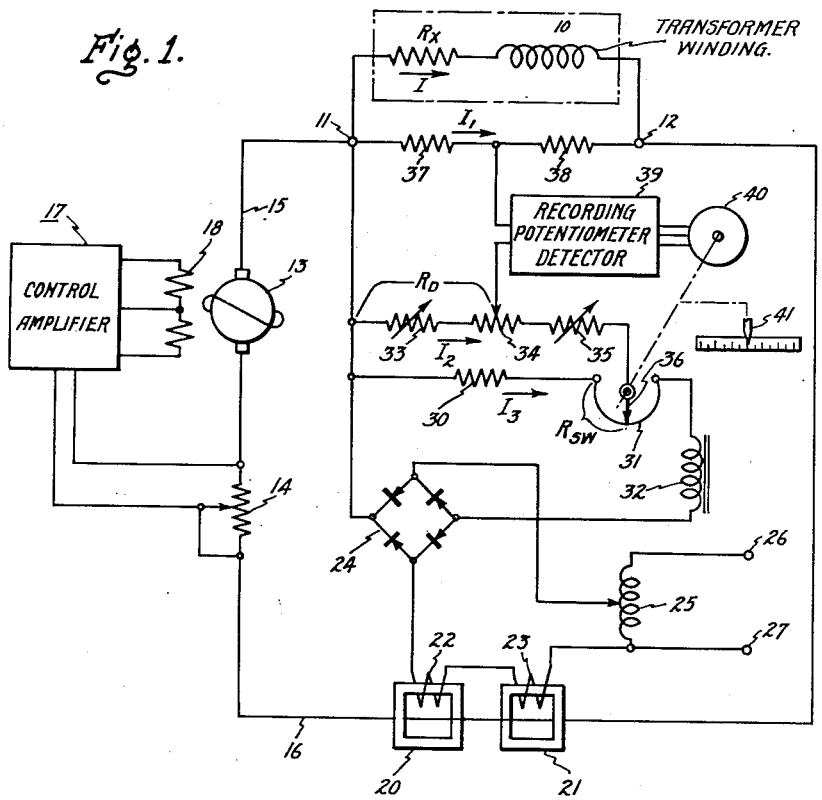

Nov. 27, 1956  L. R. RUNALDUE ET AL  2,772,395
METHOD AND APPARATUS FOR THE MEASUREMENT OF LOW RESISTANCE
Filed May 26, 1955  2 Sheets-Sheet 1

Inventor
Lewis R. Runaldue,
Jesse W. Burnett,
by Gilbert P. Tarleton
His Attorney.

United States Patent Office 2,772,395
Patented Nov. 27, 1956

2,772,395

METHOD AND APPARATUS FOR THE MEASUREMENT OF LOW RESISTANCE

Lewis R. Runaldue, Dalton, Mass., and Jesse W. Burnett, Rome, Ga., assignors to General Electric Company, a corporation of New York Application May 26, 1955, Serial No. 511,296

18 Claims. (Cl. 324—62)

This invention relates to electrical measurements, and more in particular to an improved method and apparatus for accurately measuring low resistances. While the invention is especially useful in the "hot" resistance measurement of apparatus involving a large "inductive time constant," such as power transformers, reactors, motors, generators, etc., it will be obvious that the invention may be employed for any precision low resistance measurement.

The ultimate temperature rise of electrical induction apparatus, such as power transformers, is determined from the "cold" and "hot" measurements of the resistance of the windings. The correspondence of temperature to resistance is determined by measuring the ambinet temperature of the air surrounding the transformer by means of precision thermometers housed in "thermal blocks", and measuring the average temperature of the oil surrounding the windings in the transformer with thermocouples during the "cold" resistance measurements, i. e., when the transformer is unexcited and time has been allowed for the transformer to stabilize thermally. The ultimate temperature rise of any winding in the transformer can then be determined from a "hot" resistance measurement taken after the transformer has been allowed to stabilize thermally under full load excitation, the measurement being taken immediately after the power is removed. In the full load or "heat run" excitation of the transformer, generally all of the transformer windings except the winding being tested, are short circuited, and sufficient potential is applied to the transformer so that rated current, or rated current plus exciting current flows through the winding being tested.

The problem of obtaining a good measurement of "cold" resistance is relatively simple since the transformer remains thermally stable during the measurement period and the time to obtain stable measuring current and magnetic fluxes is not too critical.

On the other hand, obtaining an accurate measurement of "hot" resistance is a major problem. To obtain an accurate determination of ultimate temperature rise of any winding, the winding resistance should be measured instantaneously and at the exact moment the alternating current "heat" run power is turned off. Since power leads have to be removed and the resistance measuring instrument leads connected before the "hot" resistance can be measured, it is obvious as will be shown later that it is not practical to obtain an instantaneous reading of resistance at the time the power is removed. Consequently, the transient measuring technique of taking a "resistance-time" cooling curve and extrapolating this curve back to zero time to obtain the "hot" resistance corresponding to ultimate temperature rise is resorted to. Using such a transient technique it follows that the closer the first reliable reading is to zero time, the time when the alternating current "heat run" power is turned off, the more accurate will be the determination of ultimate temperature rise.

A number of problems enter into obtaining a quick and reliable reading of "hot" resistance. The alternating current leads must be removed and the resistance measuring instrument leads connected. This step requires from fifteen seconds to two minutes. Time must then be allowed for all voltage drops to stabilize, the time required for stabilization being as long as 30 minutes for large transformers when previous conventional measuring techniques are employed. This stabilization time is due to the "inductive time" of the transformer, and will be discussed in more detail in the following paragraphs. Previous measurement techniques have also required from one half to one minute to balance and read the resistance measuring instrument. Since transformers cool relatively rapidly, it is evident that a lapse of time of over about four minutes before the first "hot" resistance measurement can be taken may result in very ambiguous data when the determination of the "zero time" resistance depends upon extrapolation.

The "inductive time" of a transformer may be defined as the time required for the voltage induced in the various windings and consequently the transient fluxes in various steel paths (core legs, core clamps, bolts, etc.) to come to equilibrium. From the point of view of testing, the inductive time is the time that elapses between the instance that a current from a resistance measuring instrument is applied to the transformer and the instant that a reliable reading of resistance may be made. While not fully explained, it is believed that the inductive time is due to interaction between transient voltages in the various windings and transient fluxes in the core of a transformer whenever a change in current flowing in the windings occurs. In the following disclosure, whenever the "inductive time" is employed, it will be used in relation to the latter definition, i. e., from the standpoint of testing. The inductive time constant of a transformer must not be confused, however, with the inductance time constant normally associated with a resistive-inductive circuit, and the inductance time constant, which is usually expressed as the ratio of inductance to resistance, is generally of minor importance.

In the past it has been common to employ a conventional Kelvin bridge circuit, or some modification thereof, to measure transformer winding resistance. Briefly, this circuit is comprised of a series combination of the transformer winding $R_x$, a standard resistance $R_s$, a battery, and a rheostat to maintain constant current. The lead connecting the transformer winding to the standard resistance is generally called the "yoke." A series combination of a first resistor $R_1$, and a second resistor $R_2$, is connected between the "yoke" ends of the transformer winding and the standard resistance, and a series commination of a third resistor $R_3$ and a fourth resistor $R_4$ is connected between the other ends of the transformer winding and the standard resistance. A galvanometer is connected between the junction of the first resistor and the second resistor and the junction of the third resistor and the fourth resistor. The potential bridge arms $R_1$, $R_2$, $R_3$, and $R_4$, form a circuit by which the direct current voltage drop across the transformer winding resistance $R_x$ may be compared to the reference direct current voltage drop across the standard resistance $R_s$. If the bridge arms are arranged so that the ratio of resistances of the first resistor to the second resistor is equal to the ratio of resistances of the third resistor to the fourth resistor, then it can be shown that at balance (null reading of the galvanometer), the ratio of resistances of the transformer winding to the standard resistance is also equal to the above ratio.

When the ratio of the "yoke" resistance and the contact resistance of the Kelvin bridge circuit becomes large compared to the transformer winding resistance being measured, the precision to which the bridge arms must be adjusted becomes impractical. As an approximation, if the ratio of "yoke" resistance to winding resistance is about 10:1, and error of ±0.1% in the bridge potential arms results in an error of about ±1.0% in measurement, and with a ratio of 100:1 and error of 0.1% in the bridge potential arms results in about ±10% error in measurement. If it is desirable to have an accuracy of ±0.1% or less, then it can readily be seen that the elimination of the yoke lead problem is of primary importance, especially with the extremely low values of winding resistance encountered in present design trends.

Since the length of the yoke lead must be short, it is generally necessary to locate the resistance measuring instrument as close as possible to the transformer bushings. As a result it is necessary that the instrument be portable, and the accuracy desirable is difficult to obtain with portable equipment.

Considerable difficulty has also ben encountered in previous measuring techniques in the measuring of resistance of transformers that have internal contacts, such as load tap changing transformers. When low currents, such as are used with the Kelvin bridge, are passed through the contacts, the contacts have the tendency to have variable and unstable resistance values, especially when measuring "hot" resistance. This difficulty becomes increased in the higher rated transformers, since generally the larger transformers have lower resistance, and a larger proportion of the total winding resistance appears in the contacts.

It is therefore an object of this invention to provide an improved method and apparatus for the determination of low resistance values.

It is also an object to provide an improved method and apparatus for the rapid and accurate determination of resistance of electrical apparatus having large inductive time constants, such as power transformers, reactors, motors, generators, and the like.

A further object of this invention is to provide a method and apparatus for reducing the effect of inductive time constant in the measurement of resistance of electrical apparatus such as power transformers, reactors, motors, generators, and the like.

A still further object is to provide means for the rapid and accurate determination of low values of resistance wherein the effect of resistance of leads and contacts is minimized.

Briefly stated, in accordance with one aspect of our invention, means are provided to force a direct current through the transformer winding that is sufficient to saturate the transformer. Besides reducing the effect of contact resistaces within the transformer, it has been found that saturation current flowing through the transformer windings also greatly reduces the previously described inductive time constant of the transformer. A negligible portion of the current applied to the transformer terminals is passed through a shunt resistance network in parallel with the transformer. The current flowing through the transformer windings also flows through the primary windings of a pair of saturable reactors, sufficient current flowing through the reactor primary windings to saturate the cores. An alternating current modulating voltage is applied to the secondary windings of the reactors, the secondary windings being connected such that during each half cycle of the modulating voltage the direct current and alternating current fluxes oppose each other in one reactor core and aid each other in the other reactor core. The resultant current through the secondary windings is proportional to the current flowing through the transformer windings, and this resultant current is rectified and provides a voltage drop across a slide wire resistance network proportional to the current flowing through the transformer windings. This voltage is compared to the voltage drop across the shunt resistance network by means of a calibrated recording potentiometer circuit, and the resistance value of the transformer winding is then indicated directly on an indicator of the recording potentiometer circuit.

Our invention will be better understood from the following description taken in connection with the accompanying drawings, and its scope will be pointed out in the appended claims.

Figure 2:
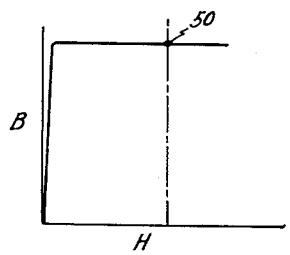
Figure 3:
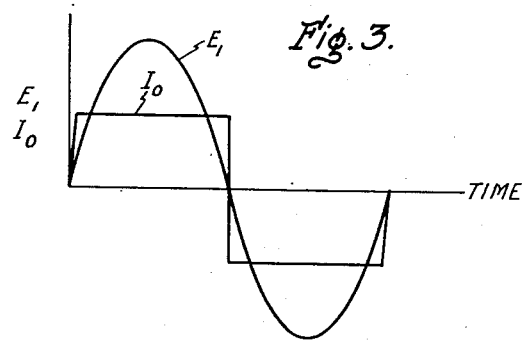
Figure 4:
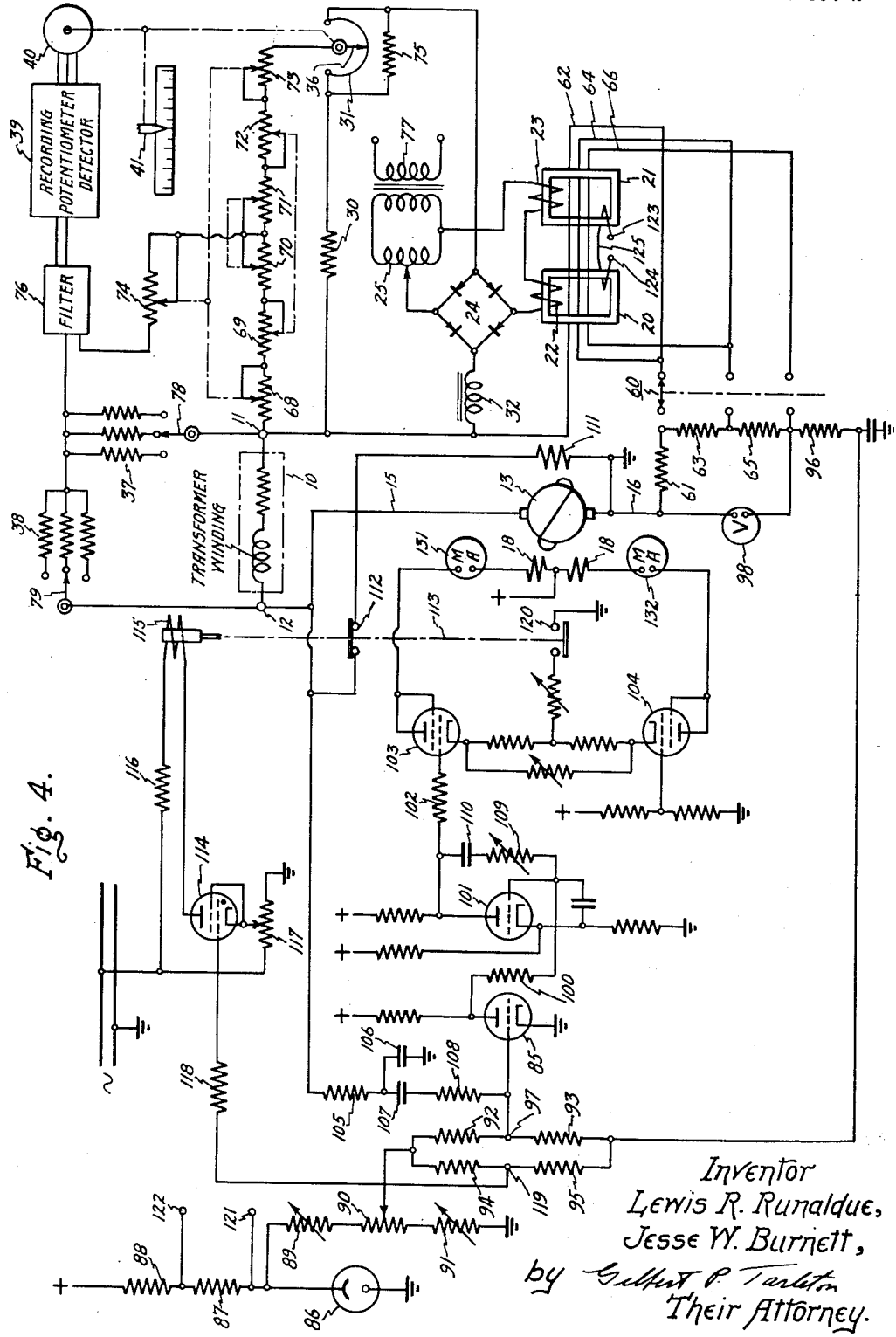

In the drawings:

Fig. 1 is a basic circuit diagram of one embodiment of this invention illustrating the connections made for determining the resistance of a transformer winding, Fig. 2 is a characteristic excitation curve of the saturable reactors of the circuit of Fig. 1, Fig. 3 is a curve of the current and voltage with respect to time of the secondary windings of the saturable reactors of the circuit of Fig. 1, and Fig. 4 is a more complete circuit diagram of one embodiment of this invention.

Referring now to the diagrams, and more in particular to Fig. 1, a transformer winding 10, the resistance of which is to be determined, has a pair of terminals 11 and 12. A constant direct current source comprised of a compensated armature reaction-excited dynamo-electric machine 13, hereinafter simply called an "amplidyne" is connected to the transformer by way of a rheostat 14 and current leads 15 and 16. The current output of the amplidyne 13 is maintained constant by means of a control amplifier 17 having an input circuit connected in parallel with the rheostat 14 and an output circuit connected to the control field winding 18 of the amplidyne 13. The current lead 16 passes through the cores of a pair of saturable reactors 20 and 21, and comprises the primary windings for the reactors 20 and 21. The secondary windings 22 and 23 respectively of the reactors 20 and 21 are connected in series to the opposite terminals of a bridge rectifier 24, and to the output winding of an auto transformer 25. The input terminals 26 and 27 of the autotransformer 25 are connected to a source of alternating potential (not shown). The primary and secondary windings of the saturable reactors are connected so that during one half cycle of the alternating potential applied to the terminals 26 and 27, the alternating current flux and the direct current flux are opposing each other in the core of the reactor 20 and aiding each other in the core of reactor 21, and during the other half cycle, the alternating current and direct current fluxes are aiding each other in the core of reactor 20 and opposing each other in the core of reactor 21. The bridge rectifier 24 rectifies the secondary current of the saturable reactors, and provides a direct current which flows through a series circuit comprised of a resistor 30, a slide wire 31, and a filter choke 32. A series circuit comprised of rheostat 33, potentiometer 34 and rheostat 35 is connected in parallel with the resistor 30 and the portion of the slide wire 31 between the arm 36 of the slide wire and the resistor 30. A series circuit comprised of resistor 37 and resistor 38 is connected between the transformer winding terminals 11 and 12, and a recording potentiometer detector circuit 39 is connected between the junction of resistors 37 and 38 and the arm of potentiometer 34. The detector 39 drives a balance motor 40 mechanically coupled to the slide wire arm 36, and also a pointer 41 indicating the position of the arm of the slide wire. The terminal 11 of the transformer winding is also connected to the junction between resistor 37 and rheostat 33.

The resistance of the resistors 37 and 38 is high compared with the resistance of the transformer windings 10, and the resistance of the series circuit comprised of rheostat 33, potentiometer 34 and rheostat 35 is high as compared with the resistance of the resistor 30 in series with the slide wire 31.

Referring now to Fig. 2 therein is illustrated a characteristic excitation curve of the saturable reactors 20 and 21 of Fig. 1. The cores are made of "square-loop" material which has a nearly perfect rectangular hysteresis loop, and also excitation characteristic as shown in Fig. 2. With the primary winding direct current excitation arranged to bias each core to a point 50 well over the saturation portion of the characteristic curve, an alternating current excitation $E_1$ (Fig. 3) to the secondary windings of the reactor will produce a square wave output current $I_0$ (Fig. 3), the peaks of which are directly proportional to the direct current flowing in the primary winding of the reactors. The slope of the initial portion of the characteristic curve of Fig. 2 and also of the current $I_0$ in Fig. 3 is greatly exaggerated for clarity, and actually, these curves have much steeper slopes.

As stated previously, the saturable reactor cores are biased in opposite directions, so that one core is operative during the first half cycle of the modulating voltage and the other core is operative during the second half cycle of the modulating voltage. The vertical portions of the current curve of Fig. 3 correspond to the horizontal portion of the curve of Fig. 2, when the reactors are saturated and offering very small impedance to the flow of current. When the secondary current flux is sufficient to oppose the primary flux and operate on the vertical portion of the curve of Fig. 2, the secondary current has little or no further change until the secondary current is reduced by decrease in the modulating voltage $E_1$ at the end of the half cycle.

Referring now to Fig. 4, a more complete circuit diagram of the invention is therein illustrated. In this diagram, a selector switch 60 is provided having three positions, in order to provide means for varying the current through lead 16 without affecting the operation point of the saturable reactors. In the upper position (as illustrated) of switch 60, current from the amplidyne 13 passes through lead 16, resistor 61, the upper contacts of the switch 60, once through each of the cores of reactors 20 and 21 by way of lead 62, thence through the transformer winding 10 and back to the amplidyne by way of lead 15. In the middle position of switch 60, the current passes through the resistors 61 and 63, through the switch 60 contacts, twice through the cores of the reactors 20 and 21 by way of leads 64 and 62, and thence back to the amplidyne by way of the transformer winding 10 and lead 15. In the lower position of the selector switch 60 the amplidyne current passes through resistors 61, 63, and 65, through the contacts of the selector switch 60, three times through the cores of reactors 20 and 21 by way of leads 66, 64, and 62, and thence back to the amplidyne by way of the transformer winding 10 and lead 15. The resistances 61, 63, and 65 are selected so that in each position of the selector switch the same magneto motive force acts on the cores of the reactors 20 and 21. This system can be extended to handle any number of current ranges.

In the circuit of Fig. 4, the series resistance circuit in parallel with the resistor 30 and the slide wire 31 is comprised of rheostats 68, 69, 70, 71, 72, and 73. Rheostats 68 and 73 are ganged together, rheostats 69 and 72 are ganged together, and rheostats 70 and 71 are also ganged together, to maintain a series constant resistance of these rheostats. These rheostats are preferably decade resistances. Another rheostat 74 in series between the junction of rheostats 70 and 71 and the filter 76 is also ganged to the rheostats 68 and 73 to maintain constant sensitivity of the circuit. A resistor 75 is connected in parallel with the slide wire 31 for calibration purposes. A filter network 76 is also connected to the input of the recording potentiometer. An isolation transformer 77 is connected to the input terminals of the autotransformer 25. In order to extend the range of operation of the instrument, resistors 37 and 38 may be comprised of a plurality of resistors connected to selector switches 78 and 79 respectively.

In the control amplifier for the amplidyne generator field coils 18, a voltage proportional to the current output of the amplidyne is applied to the grid of a first amplifier tube 85. The circuit for obtaining this voltage is comprised of a voltage regulating tube 86 having its anode connected to a source of positive direct voltage by way of resistances 87 and 88 and its cathode connected to ground reference potential. The grounds as shown in Fig. 4 represent common connection points, and may or may not be true grounds in actual practice. The plate of the voltage regulating tube is connected to ground by way of a series combination of rheostat 89, potentiometer 90, and rheostat 91. The arm of the potentiometer 90 is connected to ground by way of a parallel combination of series resistors 92 and 93 and series resistors 94 and 95, resistive component 96 of an R-C filter network, resistors 65, 63 and 61, and lead 16, the lead 16 being grounded. The junction 97 of resistors 92 and 93 is connected to the grid of the first amplifier tube 85. A voltmeter 98 is connected in parallel with resistors 61, 63 and 65. The current of the amplidyne provides a voltage drop across the resistors 61, 63 and 65 (depending upon the position of the selector switch 60) that is proportional to the output current of the amplidyne. This voltage is indicated on voltmeter 98, and for "maximum current" in each current range of the amplidyne should always indicate the same potential regardless of the setting of selector switch 60, because of the values selected for resistors 61, 63 and 65.

A feedback current that is negligible as compared to the amplidyne output current flows through resistors 61, 63, 65, 96 and the series-parallel combination of resistors 92, 93, 94 and 95 to the point of reference potential at the arm of potentiometer 90. This results in a potential at the junction 97, and therefore on the grid of the amplifier tube 85, that is proportional to the amplidyne output current, and is also dependent upon the setting of the arm of potentiometer 90.

The plate of the first amplifier is connected by way of isolation resistor 100 to the grid of a second direct current amplifier tube 101, and the plate of the amplifier tube 101 is connected by way of resistor 102 to the grid of an amplifier tube 103. The amplifier tube 103 is cathode coupled to amplifier tube 104 which has a constant voltage bias on its grid, and the amplifiers 103 and 104 are connected in a push-pull arrangement to the field control windings 18 of the amplidyne 13.

Negative feedback for stability is provided from the output of the amplidyne 13 to the grid of the first amplifier tube by means of a filter comprised of resistor 105 and capacitor 106, and a series combination of capacitor 107 and resistor 108. Controllable negative feedback is also provided by rheostat 109 and capacitor 110 between the grid and plate of second amplifier tube 101.

A "suicide" field winding 111 of the amplidyne 13 is connected in parallel with the output of the amplidyne by way of normally closed contacts 112 of a relay 113. When these contacts are closed, current from the amplidyne flows through the "suicide" winding 111 in such a manner as to reduce the output voltage of the amplidyne. The plate of a gas tetrode tube 114 is connected in series with coil 115 of relay 113 and resistor 116 to a source of alternating voltage (not shown), and the cathode of the gas tetrode is connected by way of the arm of a potentiometer 117 to ground. The other end of the potentiometer 117 is connected to a low voltage bias source of alternating potential (not shown). The grid of the gas tetrode 114 is connected by way of an isolating resistor 118 to the junction 119 between resistors 94 and 95. The relay 113 also has normally open contacts 120 in the cathode circuit of the amplifier tubes 103 and 104.

A pair of terminals 121 and 122 connected to the resistor 87 in series with the plate circuit of voltage regulating tube 86 are connected (by means not shown for the purpose of clarity) to the terminals 123 and 124 of a compensating winding 125 on the reactors 20 and 21. The purpose of this winding will be disclosed in the following paragraphs.

Milliammeters 131 and 132 may be connected in series with the plate circuits of amplifier tubes 103 and 104 respectively if desired.

Theory

Referring again to Fig. 1, if resistors 37 and 38 are very large in comparison to the resistance of the transformer winding 10, (the current I flowing through these resistors is negligible as compared to the current I flowing through the winding 10), and the resistance of rheostat 33, potentiometer 34 and rheostat 35 is very large as compared to the resistance of resistor 30 and the portion of the slide wire 31 between the side thereof connected to the resistor 30 and the arm 36 (the current $I_2$ flowing through the rheostat 33, potentiometer 34 and rheostat 35 is negligible as compared to the current $I_3$ flowing through the resistor 30 and slide wire 31), then the following relations hold:

$$IR_x = I_1(R_{37} + R_{38}) \quad (1)$$

and at balance (i. e. no current flowing through the arm of the potentiometer 34), $$K_1 I_1 R_{37} = K_1 I_2 R_D = I_3(R_{30} + R_{sw}) \quad (2)$$

and $$I_3 = K_2 I \quad (3)$$

where $R_x$ is the resistance of the transformer windings 10, $R_{30}$ is the resistance of the resistor 30, $R_{37}$ is the resistance of the resistor 37, $R_{38}$ is the resistance of the resistor 38, $R_{sw}$ is the resistance of the portion of the slide wire between the arm 36 and the side thereof connected to resistor 30, $R_D$ is the sum of the resistance of rheostat 33 and the portion of potentiometer 34 between the end thereof connected to resistor 33 and the arm of potentiometer 34, $K_1$ is a constant depending upon the setting of the arm of potentiometer 34, and $K_2$ is the constant of the saturable reactors 20 and 21.

From Equations 2 and 3:

$$I_1 = \frac{K_2 I(R_{30} + R_{sw})}{K_1 R_{37}} \quad (4)$$

and from Equations 1 and 4:

$$R_x = \frac{K_2(R_{30} + R_{sw})(R_{37} + R_{38})}{K_1 R_{37}} \quad (5)$$

letting:

$$K_R = \frac{R_{37} + R_{38}}{R_{37}} \quad (6)$$

where $K_R$ is the range ratio.

$$R_x = \frac{K_2 K_R(R_{30} + R_{sw})}{K_1} \quad (7)$$

From Equation 2:

$$I_1 = \frac{I_2 R_D}{R_{37}} \quad (8)$$

It can be shown that:

$$I_2 = K_3 I \quad (9)$$

where $K_3$ is a constant dependent upon the constant $K_2$, the values of resistance of resistor 30, rheostats 33 and 35, potentiometer 34 and the setting of slide wire arm 36. Then:

$$I_1 = \frac{K_3 I R_D}{R_{37}} \quad (10)$$

From Equations 1, 6 and 10:

$$R_x = K_3 K_R R_D \quad (11)$$

Thus it is seen from Equations 7 and 11 that $R_x$ is directly proportional to either the setting of the slide wire arm 36 or the setting of $R_D$. By proper choice of the circuit parameters, the circuit resistance arms may be made direct reading with the dials of $R_D$ calibrated directly in ohms and the slide wire calibrated in percent deviation. This latter is true, however, only if the total series resistance of rheostat 33 and 35 and potentiometer 34 is constant. This is accomplished in the circuit of Fig. 4 by ganging the rheostats 68 and 73 the rheostats 69 and 72, and the rheostats 70 and 71.

Operation

In typical operation (Fig. 4), the transformer winding 10 is connected to the measuring circuit at its terminals 11 and 12. The selector switch 60 is adjusted to provide an amplidyne current sufficient to saturate the transformer core. The resistances 37 and 38 are adjusted according to the level of resistance to be measured. The power is turned on and the rheostats 68, 69 and 70 (and therefore 71, 72 and 73 due to the mechanical coupling) are adjusted manually until the arm 36 of the slide wire 31 moves to the middle of its range by means of the balance motor 40 (thus indicating zero percent deviation). The total readings of the dials of rheostats 68, 69 and 70, which are preferably decade resistances, times the factor $K_3$ as determined by the resistances of resistors 37 and 38, is equal to the resistance of the transformer winding 10. In actual practice, a zero percent deviation reading is only approximated and the resistance of the transformer is determined by the settings of the decade resistances and also the slide wire arm. This type of manual balance is used for stable thermal conditions such as the "cold resistance" measurement of a transformer winding. For "hot" resistance or transient measurements, the decade dials of rheostats 68, 69 and 70 are preset to the expected "hot" resistance value based on the "cold" resistance measurement and expected temperature rise and the change in resistance is automatically recorded on a chart or indicated by pointer 41 as a percent deviation from the decade resistance setting.

In the circuit of Fig. 4, it is seen that varying of the arm of the potentiometer 90 provides a variable constant voltage at the junction of the resistors 92 and 94. This adjustment has been provided in order to obtain a continuous range of output currents from the amplidyne 13. There are certain restrictions upon the magnitude of change obtainable by this adjustment, however, since if the current through the saturable reactors 20 and 21 for any particular setting of the selector switch is too low, the secondary current of the reactors will not vary with the primary current. In practice, with one particular grade of core material for the reactors, it has been practical to provide variation of the arm of potentiometer 90 to obtain currents from 40% to 100% of the full excitation current for each current range as determined by selector switch 60. Another restriction against using too low of a load current in any particular current range is that the amplifier must have a sufficient signal input to function correctly. The voltmeter 98 may be calibrated in terms of percent of full excitation output current of the amplidyne for any setting of selector switch 60.

The circuit associated with the gas tetrode tube 114 has been provided for several reasons. During normal operation of the circuit, the gas tube is conducting, and therefore the contacts 112 are open and the contacts 120 are closed. When the power is first turned on, the output voltage of the amplidyne may attempt to "overshoot" the desired output voltage. In this event, current flowing through resistors 94 and 95 lowers the voltage at junction 119 sufficiently to "cut off" the gas tube. This results in lowering of the output voltage of the amplidyne, since contacts 112 close and connect the "suicide" field in parallel with the amplidyne. As soon as the amplidyne output has lowered sufficiently, the gas tube becomes conductive again. This arrangement reduces the time required for the amplidyne output to become stable. The gas tube also serves the function, when suitable switching contacts are provided, for connecting the "suicide" winding in order to lower the output of the amplidyne prior to changing transformer leads.

The compensating winding 125 has been provided in order that the secondary current of the saturable reactors be directly proportional to the primary current therethrough. Any relatively stable source of direct current of the correct magnitude may be employed to energize this winding. If the compensating winding is not provided, the secondary reactor current varies linearly with respect to the primary current, but a constant must be added to the secondary current to obtain proportionality. This constant is a result of the exciting current of the reactors.

While a source of constant direct current other than an amplidyne may be employed to saturate the core of the transformer, it is necessary that the current source be capable of attaining the desired current within a relatively short period of time following its connection to the transformer in order that the inductive time constant be overcome. In other words, in order to overcome the effect of the inductive time constant, it is necessary that the current be sufficient to saturate the transformer core and also that it have sufficient potential output to attain the saturation current in a relatively short period of time. It is not generally practical with a battery supply to furnish sufficient current to saturate a large transformer core with sufficient current limiting resistance introduced into the circuit to insure constant conditions instantaneously. Consequently, with battery supplies, the inductive time becomes too large to be tolerated in the case of the larger transformer designs. It was also not practical with the instruments generally previously employed in resistance measurements to employ such high currents, since such high current necessitates a great increase in the physical size of components in such units in order to dissipate the additional heat and reduce voltage drops.

Besides reducing inductive time, the saturation currents flowing through the transformer also reduce the effect of resistance of internal contacts in the transformer by making this resistance stable.

This invention permits the taking of initial "hot" resistance measurements within 0.5 to 2.5 minutes from the time the heat run power is removed from a transformer, the actual time being dependent upon the size and characteristics of the unit being measured. The complete isolation of the measurement from the current supply or "yoke" circuit has made the current connections less critical and reduced the connection time. This also permits placement of the instrument in a central location for measurement of a number of transformers. In addition, indeterminate errors caused by voltage or resistance drops in the current leads have been eliminated. The amplidyne controlled saturable current supply has reduced the inductive time to a useable range of 0.1 to 1.5 minutes. The self-recording feature has allowed an instantaneous and continuous plot of the resistance-time cooling curve and completely eliminated operator errors and reaction time. This is important since an operator is under extreme tension during the "taking off" of a heat run and subject to manual errors and uncontrolled reactions. This invention also permits the measurement of temperature rise of the new large transformer designs that could not previously be measured by conventional methods.

As has been previously disclosed, the instrument may be employed to take "hot" resistance measurements by a "percentage deviation" method. This method has the advantage that more accuracy is obtainable, and the response time of the instrument may be reduced. If desired, however, the slide wire may be calibrated directly in ohms. Similarly, in the circuit of Fig. 1, rheostats 33 and 35 and potentiomer 34 may be eliminated by connecting the recording potentiometer directly to the slide wire arm 36. This latter modification, however, introduces difficulties in the calibration of the instrument.

It will be understood, of course, that, while the form of the invention herein described constitutes the preferred embodiment of the invention, it is not intended herein to illustrate all of the possible equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. An apparatus for measuring the winding resistance of electrical inductive apparatus having a core and characterized by a large inductive time constant comprising current supply means providing a direct current of sufficient magnitude to saturate the core of said inductive apparatus, lead means connecting said supply means to the terminals of said inductive apparatus, calibrated resistance means, and circuit means for comparing the winding resistance of said inductive apparatus with the resistance of said calibrated resistance means.

2. An apparatus for measuring the winding resistance of electrical inductive apparatus having a core and characterized by a large inductive time constant comprising current supply means providing a constant direct current of sufficient magnitude to saturate the core of said inductive apparatus, lead means connecting said supply means to the terminals of said inductive apparatus, and means for determining the voltage drop across the windings of said inductive apparatus.

3. An apparatus for measuring the winding resistance of electrical inductive apparatus having a core and characterized by a large inductive time constant comprising current supply means providing a constant direct current of sufficient magnitude to saturate the core of said inductive apparatus, lead means connecting said supply means to the terminals of said inductive apparatus, said supply means having sufficient potential output to provide saturation current for said core within a relatively short period of time following connection of said leads to said terminals, and means for determining the voltage drop across the windings of said inductive apparatus.

4. An apparatus for measuring the winding resistance of electrical inductive apparatus having a core and characterized by a large inductive time constant comprising current supply means providing a constant direct current of sufficient magnitude to saturate the core of said inductive apparatus, lead means connecting said supply means to the terminals of said inductive apparatus, means for providing a constant direct potential, and circuit means for comparing the voltage drop across the windings of said inductive apparatus with said constant direct potential.

5. An apparatus for measuring the winding resistance of electrical induction apparatus having a core and characterized by a large inductive time constant comprising current supply means providing a constant direct current of sufficient magnitude to saturate the core of said inductive apparatus, lead means connecting said supply means to said inductive apparatus, means for providing a direct voltage proportional to said constant direct current, and calibrated circuit means for comparing said direct voltage with the voltage drop across the windings of said inductive apparatus.

6. An apparatus for measuring the winding resistance of electrical induction apparatus having a core and characterized by a large inductive time constant comprising current supply means providing a constant direct current of sufficient magnitude to saturate the core of said inductive apparatus, lead means connecting said supply means to said inductive apparatus, saturable reactor means having primary and secondary windings, said primary windings being connected in series with said lead means, said secondary windings providing a voltage proportional to said constant direct current, and calibrated circuit means for comparing said voltage with the voltage drop across the windings of said inductive apparatus.

7. An apparatus for measuring the winding resistance of electrical induction apparatus having a core and characterized by a large inductive time constant comprising current supply means providing a constant direct current of sufficient magnitude to saturate the core of said inductive apparatus, lead means connecting said supply means to said inductive apparatus, saturable reactor means having primary and secondary windings, said primary winding being connected in series with said lead means, the current flowing through through said primary windings being of sufficient magnitude to saturate the core of said reactor means, means providing an alternating modulating current through said secondary winding, means for rectifying said alternating current to provide a direct current proportional to said constant current, calibrated resistance means in series with said secondary winding, and circuit means for comparing the voltage drop across said inductive apparatus with a portion of the voltage drop across the windings of said calibrated resistance means.

8. An apparatus for measuring the winding resistance of electrical induction apparatus having a core and characterized by a large inductive time constant comprising current supply means providing a constant direct current of sufficient magnitude to saturate the core of said inductive apparatus, lead means connecting said supply means to said inductive apparatus, saturable reactor means having primary and secondary windings, said primary windings being connected in series with said lead means, the ampere turns of said primary winding being sufficient to saturate the core of said reactor means, means providing an alternating modulating current through said secondary winding, means for rectifying said alternating current to provide a direct current proportional to said constant current, slide wire means in series with said secondary windings, first and second resistors in series connected across the terminals of said inductive apparatus, and null balance potentiometer circuit means for comparting the voltage drop across said first resistor with the voltage drop across said slide wire means.

9. The apparatus of claim 8 wherein said direct current supply means is a compensated armature reaction-excited dynamo-electric machine.

10. The method of determining the winding resistance of electrical induction apparatus having a core and characterized by a large inductive time constant comprising saturating the core of said apparatus with a constant direct current, and determining the voltage drop across the windings of said apparatus.

11. The method of determining the winding resistance of electrical induction apparatus having a core and characterized by a large inductive time constant comprising saturating the core of said apparatus with a constant direct current, and comparing the voltage drop across the windings of said apparatus with a calibrated potential.

12. The method of determining the "hot" winding resistance of electrical apparatus having a core and characterized by a large inductive time constant comprising saturating the core of said apparatus with a constant direct current, setting a null balance potentiometer to the approximate "hot" value of resistance of said winding, and measuring the deviation between said approximate value and the actual value of resistance of said winding.

13. An apparatus for measuring low resistance comprising a source of direct current, lead means for connecting said source to an unknown resistance to be measured, saturable reactor means having primary and secondary windings, said primary windings being connected in series with said lead means, the current flowing through said primary windings being of sufficient magnitude to saturate the core of said reactor means, means providing an alternating modulating current through said secondary winding, means for rectifying said alternating current to provide a direct current proportional to the current flowing through said lead means, calibrated resistance means in series with said secondary winding, and circuit means for comparing the voltage drop across said unknown resistance with at least a portion of the voltage drop across said calibrated resistance means.

14. An apparatus for measuring low resistance comprising a source of constant direct current, lead means for connecting said source to an unknown resistance to be measured, saturable reactor means having primary and secondary windings, said primary windings being connected in series with said lead means, the ampere turns of said primary winding being sufficient to saturate the core of said reactor means, means providing an alternating modulating current through said secondary winding, means for rectifying said alternating current to provide a direct current proportional to said constant direct current, slide wire means in series with said secondary winding, and null balance potentiometer circuit means for comparing the voltage drop across said first resistor with the voltage across said unknown resistor.

15. An apparatus for measuring low resistance comprising a source of constant direct current, lead means for connecting said source to an unknown resistance to be measured, saturable reactor means having primary and secondary windings, said primary windings being connected in series with said lead means, the ampere turns of said primary winding being sufficient to saturate the core of said reactor means, means providing an alternating modulating current through said secondary winding, means for rectifying said alternating current to provide a direct current proportional to said constant direct current, a first resistor and a slide wire means in series with said secondary winding, potentiometer means in parallel with said first resistor and the portion of said slide wire means between the end thereof connected to one end of said first resistor and the arm of said slide wire means, the resistance of said potentiometer means being constant and substantially greater than the resistance of said first resistor and said portion of said slide wire means, second and third resistors connected in series across said unknown resistance, null balance potentiometer circuit means connected between the arm of said potentiometer means and the junction of one end of each of said second and third resistors, and conducting means connecting the other ends of said first and second resistors.

16. An apparatus for measuring low resistance comprising a source of constant direct current, lead means for connecting said source to an unknown resistance to be measured, saturable reactor means having primary and secondary windings, said primary windings being connected in series with said lead means, the ampere turns of said primary winding being sufficient to saturate the core of said reactor means, means providing an alternating modulating current through said secondary winding, means for rectifying said alternating current to provide a direct current proportional to said constant direct current, a first resistor and a slide wire means in series with said secondary winding, potentiometer means in parallel with said first resistor and the portion of said slide wire means between the end thereof connected to one end of said first resistor and the arm of said slide wire means, the resistance of said potentiometer being constant and substantially greater than the resistance of said first resistor and said portion of said slide wire means, second and third resistors connected in series across said unknown resistance and having a resistance substantially greater than that of said unknown resistance, null balance potentiometer circuit means connected between the arm of said potentiometer means and the junction of one end of each of said second and third resistors, said potentiometer circuit having balance motor means mechanically coupled to said slide wire arm, and conducting means connecting the other ends of said first and second resistors, the values of the components of said apparatus being selected so that at null balance on the potentiometer circuit means $$R_x = K_3 K_E R_D$$

where $R_x$ is the resistance of the unknown resistor, $K_R$ is a constant proportional to the sum of resistance of the second and third resistors divided by the resistance of the second resistor, $R_D$ is the resistance of the portion of the potentiometer between the arm thereof and the end connected to the other end of said first resistor, and $K_3$ is a constant proportional to the setting of the arm of said slide wire means.

17. An apparatus for measuring low resistance comprising a source of constant direct current, lead means for connecting said source to an unknown resistance to be measured, saturable reactor means having primary and secondary windings and a core, said core being of a material having a substantially rectangular hysteresis loop, said primary windings being connected in series with said lead means, the current flowing through said primary winding being of sufficient magnitude to saturate the core of said reactor means, means providing an alternating modulating current through said secondary winding, means for rectifying said alternating current to provide a direct current proportional to the current flowing through said lead means, calibrated resistance means in series with said secondary winding, and circuit means for comparing the voltage drop across said unknown resistance with at least a portion of the voltage drop across said calibrated resistance means.

18. An apparatus for measuring low resistance comprising a source of constant direct current, lead means for connecting said source to an unknown resistance to be measured, saturable reactor means having primary and secondary windings and a core, said core being of a material having a substantially rectangular hysteresis loop, said primary windings being connected in series with said lead means, the ampere turns of said primary winding being sufficient to saturate the core of said reactor means, means providing an alternating modulating current through said secondary winding, means for rectifying said alternating current to provide a direct current proportional to said constant direct current, slide wire means in series with said secondary winding, and null balance potentiometer circuit means for comparing the voltage drop across said first resistor with the voltage across said unknown resistor.

References Cited in the file of this patent

UNITED STATES PATENTS 2,648,820  Miller _____ Aug. 11, 1953
2,707,265  Lugosch _____ Apr. 26, 1955

OTHER REFERENCES

Shiepe: "Radio World," December 1936, pp. 12, 13.
Wilkinson: "Proceedings of the Institution of Electrical Engineers," vol. 101, part II, No. 81, June 1954, pp. 308–320.